Jan. 12, 1932.  W. H. PECK  1,840,524
PROCESS OF PRINTING MULTICOLOR FILMS
Filed Nov. 22, 1929
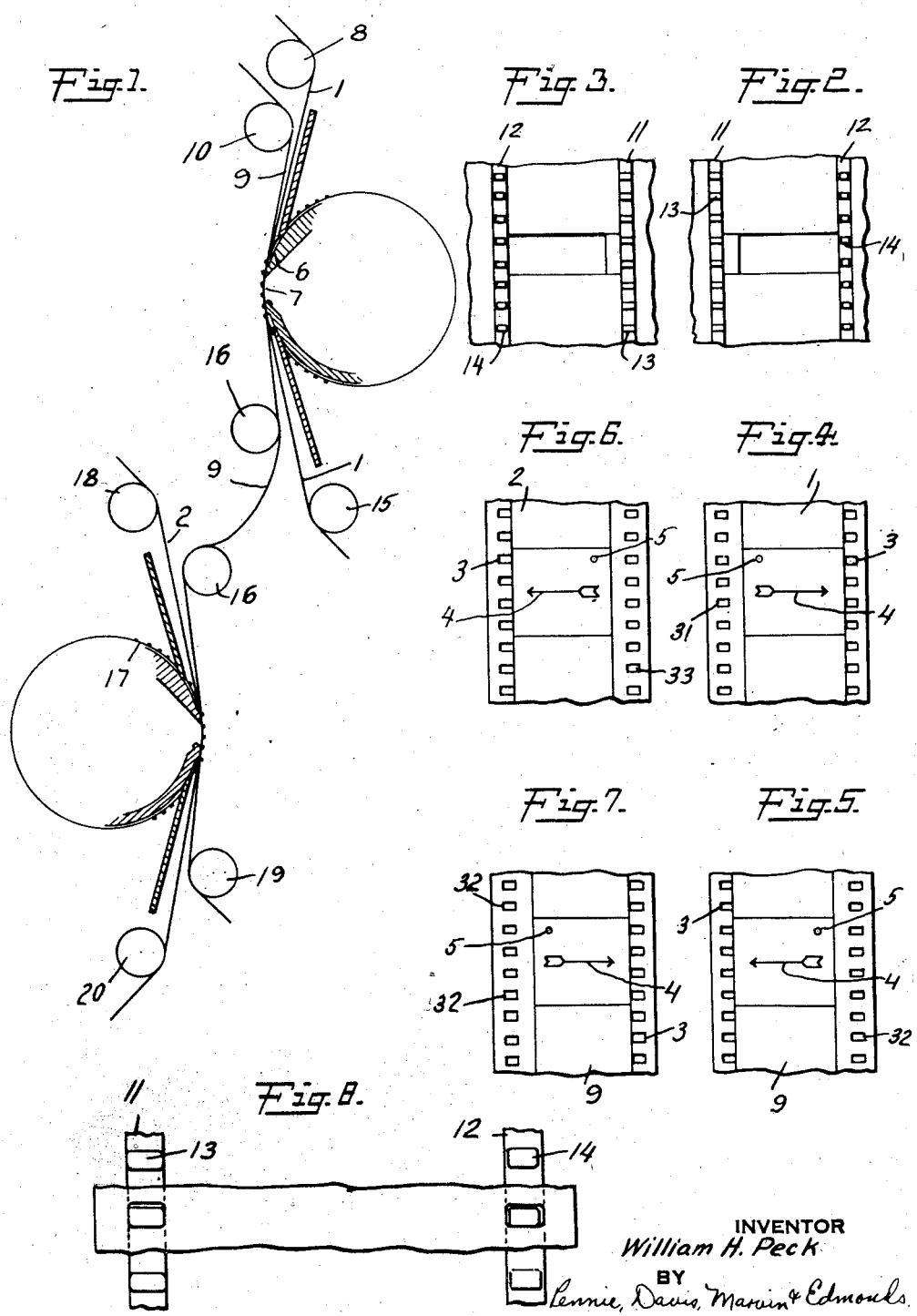
INVENTOR
William H. Peck
BY
Pennie, Davis, Marvin & Edmonds
ATTORNEYS Patented Jan. 12, 1932

1,840,524

UNITED STATES PATENT OFFICE

WILLIAM H. PECK, OF SCARSDALE, NEW YORK, ASSIGNOR TO COLORCRAFT CORPORATION, OF NEW YORK, N. Y., A CORPORATION OF DELAWARE

PROCESS OF PRINTING MULTICOLOR FILMS

Application filed November 22, 1929. Serial No. 409,085.

This invention relates to method of printing multi-colored moving picture films.

In printing moving picture films it is essential that proper registration be obtained between the negative and the positive films. As the projected picture is formed from a series of separate pictures passed through the projecting machine in rapid sequence, any variation in the position of an object on two successive sections of the film, other than that intended by the movement of the object or objects photographed, will cause the reproduction to be indistinct and blurred.

In the original development of the black and white film, the positive films were made from the negative in an intermittent machine. Each section or frame was brought in front of a shutter and the positive and negative films securely held in proper registration during the printing operation. The shutter was opened to print the section of positive film after the positive and negative films had been arranged in proper registration and then closed until a new section of the films was arranged in the printing position.

When the first attempts were made to print the positive films in a continuous machine to increase production, difficulties were encountered, due primarily to slippage or creepage of the film. The difference in length between the positive and negative films, known as negative shrinkage, also presented difficulty to be overcome. Before the continuous printing machine was successful in connection with motion picture films, it was necessary to devise some means for securing proper registration of the film frames and to prevent slippage or creepage.

Such difficulties have been overcome and at the present time black and white moving picture films are printed on continuous machines, one of which is the Bell and Howell continuous printer. Such machines have been carefully designed to allow for variations in the films and to properly register the film frames over the printing aperture. Variations in the films are provided for by feeding and registering the films from one side and negative shrinkage is overcome by employing a convex surface of such radius that the arc travelled by the positive film on top of the negative film is just the proper amount longer than the arc travelled by the negative film to compensate for this difference in length. The feeding means is a sprocket wheel having two sets of teeth spaced from each other a distance equal to the width of the film. The teeth on one side are of the same width transversely as the film perforations, and the films are registered transversely by these teeth. The two sets of teeth cooperate to feed the films and register them longitudinally.

In the manufacture of multi-color moving picture films by one process, screens of two complementary colors, such as red and green, are used. Photographs for each negative are taken simultanenously but directionally reversed. A positive film is preferably used having an emulsion on each side for the printing of the picture on each side and these pictures are then colored in the two colors. In printing the positive film, the pictures in one color value must first be printed on one side from one negative and then in the other color value on the other side from the other negative. Proper registration of the positive film and each negative film is necessary for the reasons set forth above in connection with the black and white films and furthermore, it is necessary that the two pictures on the opposite sides of the film properly register or, in reproduction a color fringe will result around the edges of the objects in the picture. The difficulties resulting from the necessity of registering the separate photographs on each frame of the film has resulted in the return to the intermittent process of printing in connection with multi-color pictures. Due to the variations in films, proper registration can not be obtained with the present continuous printing machines in which the feeding and registering means is arranged on one side of the machine. It will be apparent that if the positive film is passed through the machine first with one negative to print on one side of the positive film and then with the other negative to print on the other side of the positive film, the positive film will be engaged by the registering and feeding mechanism on opposite sides of the film in its two passages through the machine. Such method of printing results in improper registration of the pictures with the resulting color fringes referred to above. This difficulty can not be overcome by feeding the films through the machine in a reverse direction as these printing machines are provided with elaborate tensioning devices which function in connection with the feeding means to obtain proper registration and which are operable in only one direction.

In the present invention I provide a method of printing multi-color positive films wherein the feeding position of the two negatives is reversed, that is, one negative is fed by a sprocket wheel or like device engaging the perforations on one side and the other negative is fed through a sprocket wheel or like device engaging the perforations on the other side so that the positive film will be fed from the same set of perforations during both printing operations and proper registration of the two pictures on opposite sides of the positive film is thus obtained.

In the accompanying drawings I have illustrated, more or less diagrammatically, the method of printing multi-color films. In the drawings:

Fig. 1 is a diagrammatic view in side elevation or vertical section showing the printing operation with various details of the printing machine omitted;

Fig. 2 is a front elevation of one section of the printing apparatus adjacent the printing aperture;

Fig. 3 is a similar view of the other section of the printing apparatus;

Fig. 4 is a face view of a section of the negative film of one color, such as red;

Fig. 5 is a similar view of one face of the positive film which is printed by the negative of Fig. 4;

Fig. 6 is a similar view of the other negative film of a complementary color, such as green;

Fig. 7 is a similar view of the side of the positive film printed by the negative of Fig. 6; and Fig. 8 is an enlarged view of a portion of the feeding and registering mechanism of the printing machine showing a section of film in position.

Referring to the drawings the reference numeral 1 designates a negative film of one color value, such as red, and 2 represents a section of a negative film of a complementary color value, such as green. These films are provided with the usual spaced perforations 3 at their edges. As stated, the two pictures are taken simultaneously but directionally reversed as indicated by the arrows 4 and circles 5 on the negatives. In printing a positive from these two negatives a film is employed having an emulsion on one face thereof for printing a picture which may be colored red and on the opposite face thereof for printing a picture which may be colored green.

The usual continuous printing apparatus now in use in this industry consists of a convex surface 6 over which the negative and positive films are passed with the positive film on the outside and passed through the longer arc to compensate for the negative shrinkage and the resulting difference in length between the two films. This surface is provided with a printing aperture 7 back of which is arranged a lamp (not shown) or other suitable source of light for the printing operation. In these continuous printing machines suitable means are provided for controlling the speed of the feed mechanism and for controlling the light intensity. Such details form no part of the present invention and are accordingly not illustrated in the drawings. As shown in Fig. 1 of the drawings, in carrying out my process, the red negative film 1 is fed from a suitable reel or other support over a guide roll 8 in conjunction with a positive film 9 passing over a similar guide roll 10 to the printing aperture. As shown in Figs. 5 and 7 of the drawings, the positive film is provided with perforations similar to the perforations 3 of the negative film and likewise similarly spaced from each other. The conventional type of feeding and registering means for the film to insure proper registration is a sprocket wheel consisting of two sides or sections 11 and 12 (see Fig. 8) spaced from each other a distance equal to the distance between the perforations on opposite sides of the film. The section 11 is provided with teeth 13 of a width equal to the width of the perforations but of a depth less than the depth of the perforations so that when the film is travelling downwardly in Fig. 8 of the drawings the sprocket teeth engage the front and two side walls of the perforations. In order to provide for variations in the spacing of the perforations on opposite sides of the film, the section 12 is provided with teeth 14 of less length and width than the perforations as clearly shown in Fig. 8 of the drawings and these teeth merely enter the perforations at the other side of the film and keep it travelling in a straight line. It is the usual practice to build these continuous printing machines with the feeding and registering side 11 of the sprocket on the left as the observer faces the machine as shown in Fig. 8 of the drawings and the upper printing apparatus shown in Fig. 1 of the drawings is of the conventional construction as indicated in Fig. 2 where section 11 appears at the left.

After the green positive film has been printed, the red negative 1 passes over a suitable guide roll 15 to a take-up roll (not shown) and the positive film passes over suitable guide rolls 16 to a position adjacent the second printing apparatus 17. In the second printing apparatus the opposite face of the positive film 9 is toward the printing machine as shown and the negative film 2 is fed from a suitable source (not shown) over a guide roll 18. After the printing operation is completed, the films are separated, passing over guide rolls 19 and 20, respectively, to suitable take-up rolls (not shown). In order that the positive film may be fed and registered by the same set of perforations throughout the two printing operations, the teeth 13 and 14 of the lower printing apparatus are reversed as shown in Fig. 3 of the drawings with the section 11 on the right as the observer faces the machine.

The printing operation will be more clearly understood from Figs. 4 to 7 of the drawings. As stated above, the negative films are directionally reversed. When the positive film is fed through the first printing apparatus with the negative film 1 the perforations 31 on the left side of the negative film engage the teeth 13. As Fig. 5 of the drawings shows the green positive face of the film, the position is reversed from the position occupied during the printing operation and the positive film is thus guided and fed by the perforations 32 on the right of Fig. 5 engaging the sprocket teeth 13 of the section 11. The arrow 4 and circle 5 are printed on this side of the film as indicated in Fig. 5 of the drawings.

During the second printing operation the negative green film 2 is guided and fed from the right hand side of the film by the perforations 33, due to the fact that the teeth 13 are placed on the right hand side of the second printing apparatus. The arrow 4 and circle 5 shown in Fig. 7 of the drawings are printed during this printing operation and this face of the positive film is therefore in contact with the negative film so that the positive film is guided and fed by the perforations at the left in Fig. 7. However, as Figs. 5 and 7 are views on opposite faces of the positive film, it will be apparent that the guiding, feeding and registering of the positive film takes place with the same set of perforations 32 throughout the two operations. The result is that proper register of the two sets of pictures on the opposite sides of the positive film, shown in Figs. 5 and 7 of the drawings, is obtained and the colored moving picture can thus be reproduced without a color fringe around the edges of the objects shown in the pictures.

As stated above the teeth 13 engage the front edge and two sides of the film perforations to register the films transversely, and to feed them and register them longitudinally. The teeth 14 also engage the front edge of the perforations to co-operate in feeding the films, and registering them longitudinally. In the claims the expression "feeding and registering" is used to designate the function of the teeth 13.

I claim:—

1. The process of printing multi-color motion picture films on double coated stock on a continuous printing machine having combined feeding and registering means which comprises passing a negative film of one color value and a superposed positive film over a printing machine, feeding and registering the films by combined feeding and registering means at one side of the machine, superposing the positive film over a second negative film with the unprinted side of the positive in contact with the negative, and then feeding and registering the films by combined feeding and registering means at the opposite side of the second printing machine.

2. The process of printing multi-color moving picture films on double coated stock on a continuous printing machine having combined feeding and registering means, which comprises passing a negative film of one color value and a superposed positive film over a printing machine, feeding and registering the films by combined feeding and registering means engaging the films at one side, superposing the positive film over a second negative with the unprinted side of the positive in contact with the negative, and then feeding and registering the films by combined feeding and registering means engaging on the same side of the positive film as that engaged during the first printing operation.

3. The process of printing multi-color moving picture films on double coated stock on a continuous printing machine having combined feeding and registering means which comprises passing a negative film of one color value and a superposed positive film over a printing machine, feeding and registering the films by combined feeding and registering means at one side of the machine, reversing the positive film to print a second series of pictures of another color value, then feeding the positive film and a second negative over a second printing machine by means of combined feeding and registering means arranged at the opposite side of the machine.

4. The process of printing multi-color moving picture films on double coated stock on a continuous printing machine having combined feeding and registering means which comprises passing a negative film of one color value and a superposed positive film over a printing machine, feeding and registering the films by combined printing and registering means at one side of the machine engaging the perforations in the films, reversing the positive film to print a second series of pictures of another color value, passing the positive film superposed over a second negative film over a second printing machine, and feeding and registering the films by combined feeding and registering means engaging the same perforations in the positive film as were engaged by the combined feeding and registering means of the first printing machine.

In testimony whereof I affix my signature.

WILLIAM H. PECK.